(12) United States Patent
Hendron

(10) Patent No.: US 7,217,080 B2
(45) Date of Patent: May 15, 2007

(54) MOBILE INTERFACE STRUCTURE WITH MULTIPLE DEGREES OF FREEDOM

(75) Inventor: Scott Svend Hendron, Dubuque, IA (US)

(73) Assignee: Deere & Company, Moline, IL (US)

(*) Notice: Subject to any disclaimer, the term of this patent is extended or adjusted under 35 U.S.C. 154(b) by 224 days.

(21) Appl. No.: 10/873,366

(22) Filed: Jun. 21, 2004

(65) Prior Publication Data
US 2006/0018745 A1    Jan. 26, 2006

(51) Int. Cl.
*E02F 3/36* (2006.01)

(52) U.S. Cl. ............... 414/694; 414/686; 414/703; 280/446.1

(58) Field of Classification Search ............... 414/694, 414/703, 708, 686; 172/272–275; 280/446.1, 280/455.1
See application file for complete search history.

(56) References Cited

U.S. PATENT DOCUMENTS

| | | | | |
|---|---|---|---|---|
| 3,697,099 A | * | 10/1972 | Potts et al. | 280/455.1 |
| 4,313,616 A | * | 2/1982 | Howard | 280/455.1 |
| 4,944,649 A | | 7/1990 | Stralow et al. | 414/686 |
| 5,405,238 A | * | 4/1995 | Samsel, Jr. | 414/703 |
| 5,511,329 A | | 4/1996 | Mickelson et al. | 37/468 |
| 7,008,168 B2 | * | 3/2006 | Bernhardt et al. | 414/703 |

FOREIGN PATENT DOCUMENTS

| | | |
|---|---|---|
| DE | 26 42 311 | 3/1978 |
| DE | 38 14 775 | 11/1989 |
| EP | 0 948 882 | 10/1999 |
| EP | 1 095 549 | 5/2001 |

OTHER PUBLICATIONS http://www.hexapods.net/hexapod/htm; Remote Pit Operation Enhancement System: Concept Selection Method and Evaluation Criteria; S.A. Bailey, J.M. Alzheimer, C.P. Baker, J.T. Smalley; J.C. Tucker, P.L. Valdez, Dec. 1999, p. 8.8.

* cited by examiner

Primary Examiner—Donald Underwood

(57) ABSTRACT

A mobile interface system for a work vehicle that affords degrees of freedom for roll as well as conventional pitch and yaw or swing motion control for a mobile interface structure to which a linkage or a work tool is attached. The mobile interface structure for a backhoe is a swing frame. The roll, pitch and yaw motions are relative to the work vehicle.

35 Claims, 8 Drawing Sheets

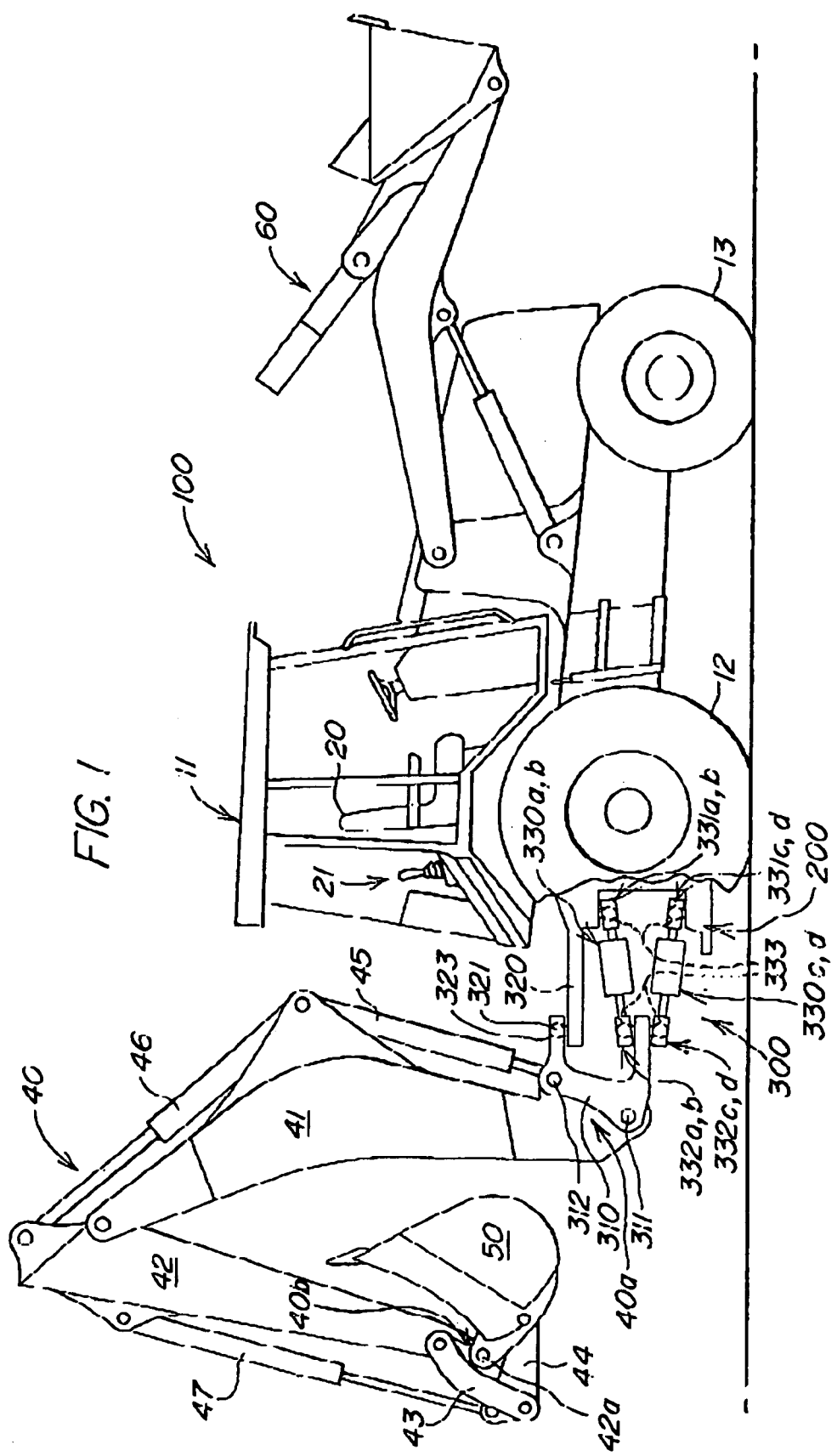

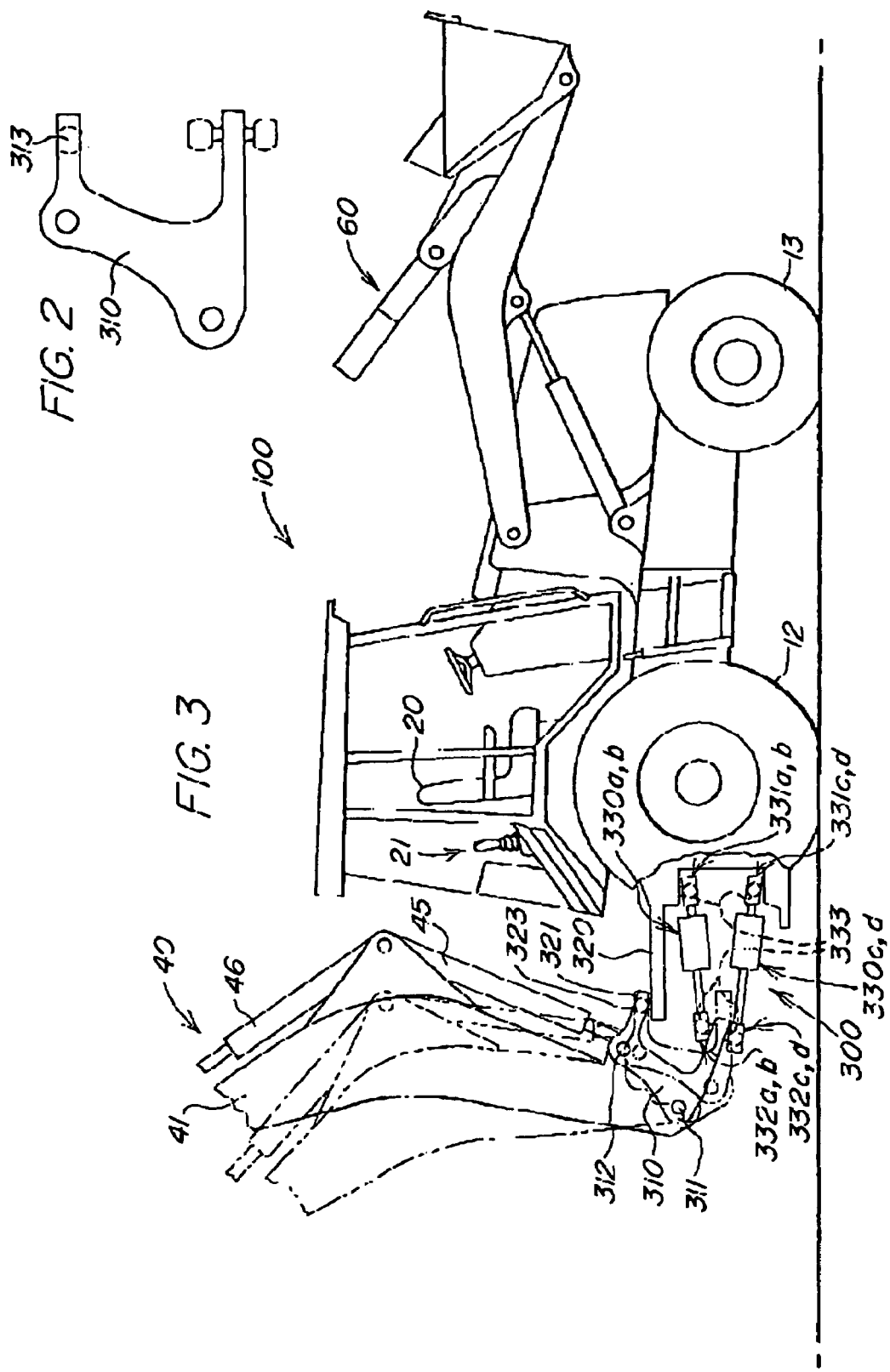

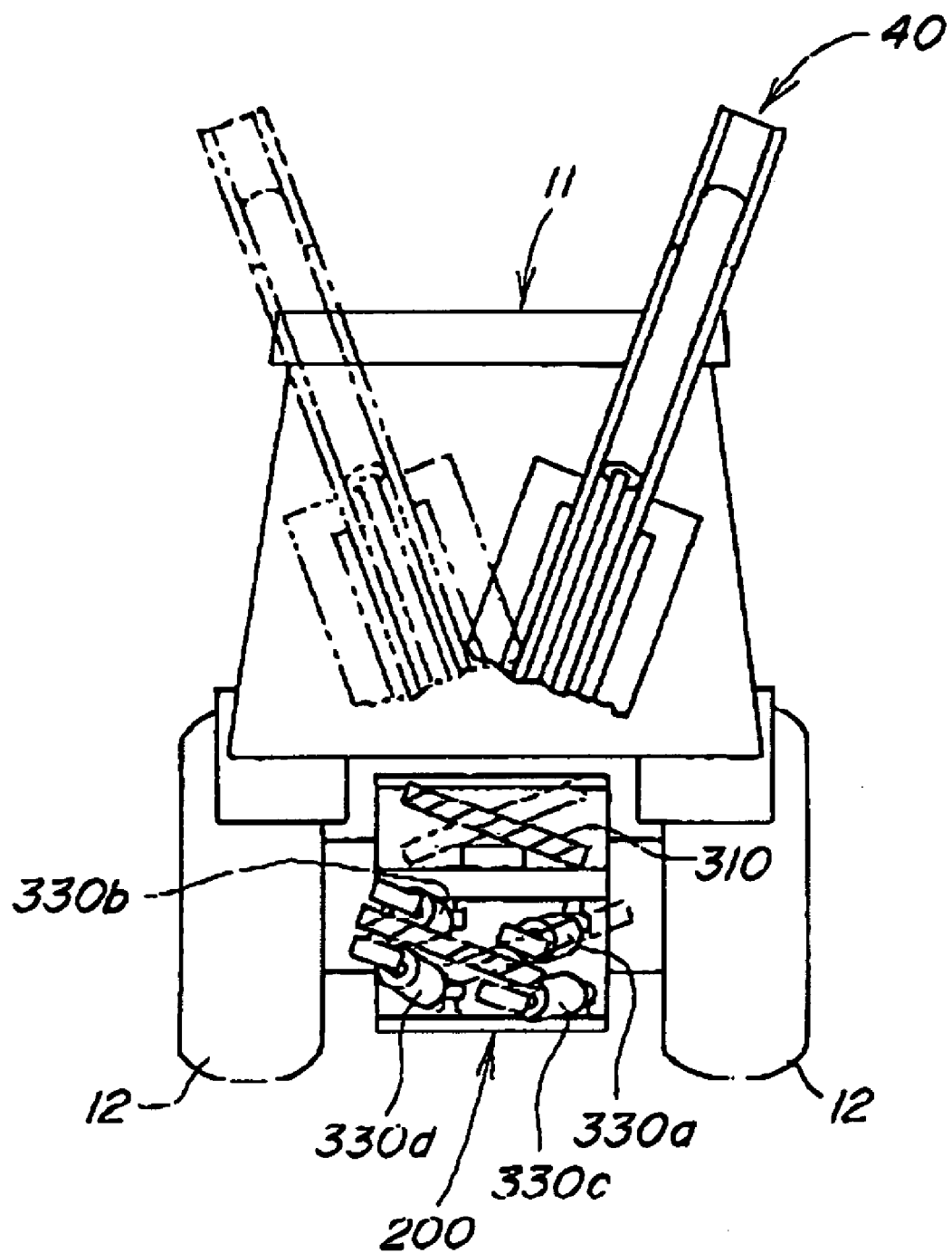

MOBILE INTERFACE STRUCTURE WITH MULTIPLE DEGREES OF FREEDOM

FIELD OF THE INVENTION

The invention relates to the positive positioning of work tools for work vehicles. More specifically, it relates to a method, system and apparatus for positively controlling an interface structure such as, for example, a swing frame for a backhoe with multiple degrees of freedom. This manner of control also affords more degrees of freedom to the boom and, ultimately, the work tool of the backhoe.

BACKGROUND OF THE INVENTION

Work vehicles generally include mobile interface structures for manipulating at least one of a tool and a linkage with respect to a vehicle body frame. The linkage is typically attached to the mobile interface structure with one pivotal degree of freedom but may move with an additional degree of freedom because the mobile interface structure also has one pivotal degree of freedom with respect to the vehicle body frame.

Backhoes include a mobile interface structure through which the linkage and the backhoe tool are connected to the vehicle body frame. This mobile interface structure is aptly called a swing frame and is typically limited to one pivotal degree of freedom with respect to the vehicle, i.e., a yaw, or swinging, movement. A boom is pivotally attached to the swing frame and is typically limited to one pivotal degree of freedom, i.e., pitch, with respect to the swing frame. All other parts of the linkage are generally limited to pitch movement with respect to the other parts to which they are attached. Thus, the work tool movements with respect to the vehicle frame are limited to yaw, pitch and translational motions.

SUMMARY OF THE INVENTION

As discussed above, due to the nature of the attachments between the swing frame and the body frame and between all other elements of the backhoe linkage, general movements, for any portion of the linkage or the work tool with respect to the vehicle frame, are limited to yaw, pitch and translational motions. This can lead to difficulties when side digging is required as when, for example, an operator wishes to dig a trench in a somewhat sideways direction. It can also lead to longer, bulkier linkage parts in order to provide a given depth for the work tool. Longer, bulkier linkage parts result in weight distribution problems for a work vehicle that is heavier and longer. This translates to fuel inefficiencies and relatively awkward handling for the work vehicle.

Provided herein is a mobile interface system that affords freedom for roll or tilt as well as pitching and yaw motions to the mobile interface structure, thus imparting these freedoms to the linkage or tool connected to the mobile interface structure. This is accomplished through the use of several vertically rigid longitudinal members having the capacity to positively alter their lengths. Each longitudinal member is pivotally attached with multiple degrees of freedom to the vehicle frame and the mobile interface structure at its first end and second end, respectively.

BRIEF DESCRIPTION OF THE DRAWINGS

Embodiments of the invention will be described in detail, with references to the following figures, wherein:

FIG. 1 is a side view of a work vehicle illustrating an exemplary embodiment of the invention;

FIG. 2 is an illustration of the mobile interface structure, i.e., the swing frame, shown in FIG. 1;

FIG. 3 is a side view of the vehicle in FIG. 1 illustrating pitching motion for the swing frame and linkage;

FIG. 4 is a rear end view of the work vehicle in FIG. 1 illustrating rolling or tilting movement of the swing frame and the linkage;

DESCRIPTION OF THE ILLUSTRATED EMBODIMENT

Figure 12:
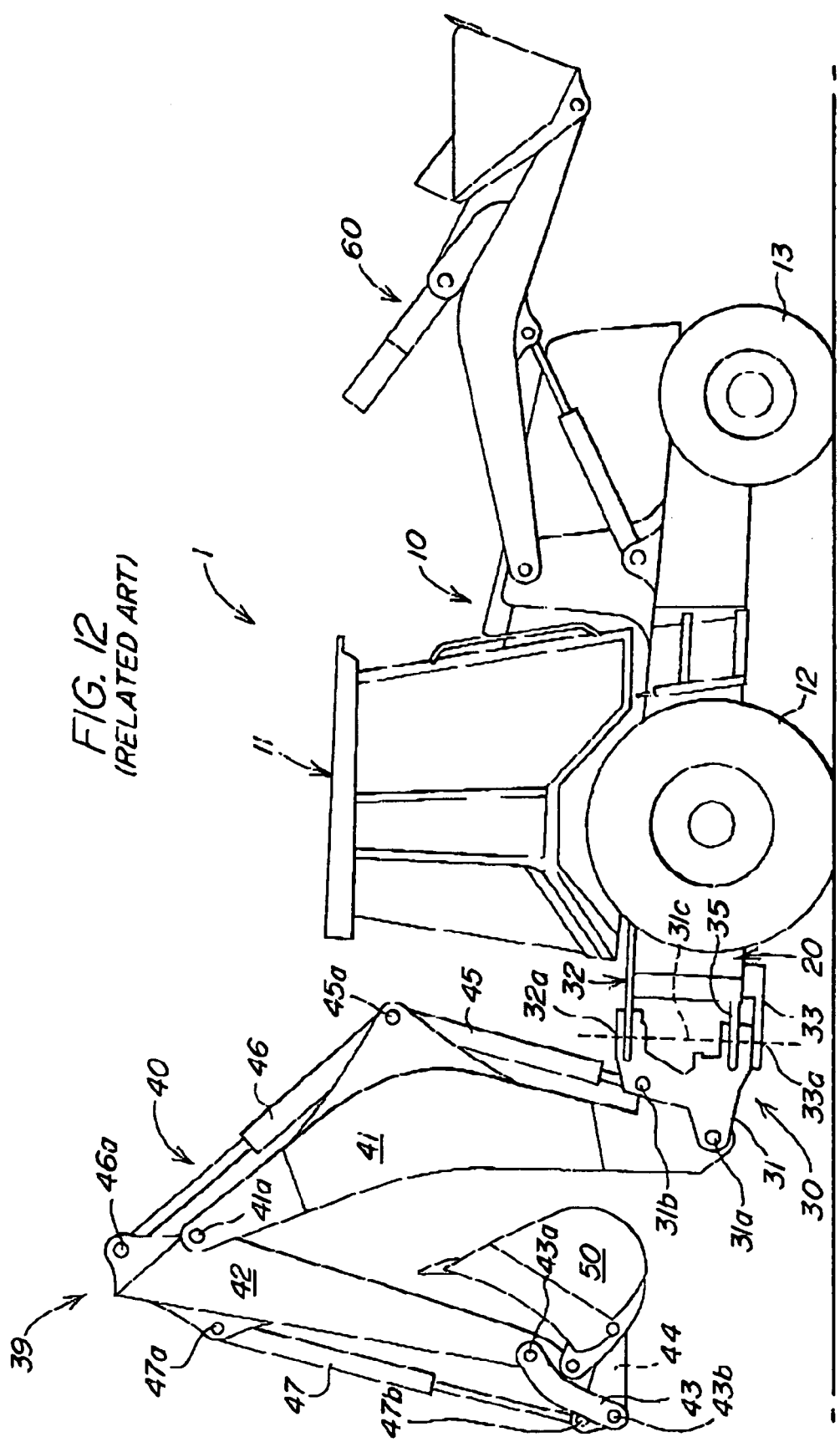
FIG. 12 is a side view of a work vehicle having a conventional swing frame.

FIG. 12 illustrates a conventional work vehicle 10 in which the invention may be used. The particular work vehicle 10 shown in FIG. 12 is a loader backhoe which, typically, has dual functions. The functions of the particular work vehicle 10 illustrated are that of a backhoe and that of a loader. The work vehicle 10 includes a cab 11, a vehicle frame 20, a mobile interface system 30, a backhoe portion 39 and a loader portion 60. It also includes wheels 12 and 13 as well as a propulsion system (not shown) that propels it along the ground in a manner well known in the art.

The mobile interface system 30 is a conventional system which includes a mobile interface structure or swing frame 31, two swing frame anchors 32 and 33, and two hydraulic cylinders 35. The swing frame 31 is pivotally constrained such that it is capable of only yaw or swing motion, i.e., the conventional swing frame 31 is constrained to pivoting motions around axis 31c as anchors 32 and 33 are rigid members that are rigidly attached to the frame 20 and the two hydraulic cylinders 35 are on opposite sides of the pivot axis 30b defined by fixed pivot points 32a and 33a and rigidly attached to the vehicle frame 20.

The backhoe portion of the work vehicle 10 includes a bucket 50 and a linkage 40. The linkage includes a boom 41 and an arm 42. A first end of the boom 41 is pivotally connected to the swing frame at pivot 31a with a single degree of freedom in the pitch direction with respect to the swing frame. A second end of the boom 41 is pivotally connected to a first end of the arm 42 at pivot 41a with a single degree of freedom in the pitch direction with respect to the arm 42. A second end of the arm 42 is pivotally connected to the bucket at pivot 42a with a single degree of freedom in the pitch direction with respect to the bucket.

This kind of arrangement does not permit rolling or tilting movement of the linkage 40 with respect to the frame 20 and, thus, makes several types of operations such as, for example, digging trenches sideways, difficult to impossible. In fact, with conventional backhoes, digging angled trenches cannot be accomplished without tilting the entire work vehicle 10 to the desired trench angle. Further, it is readily evident that conventional mobile interface systems of this type cannot be easily modified to allow greater pivotal freedom as pivot points 32a and 33a are fixed in space, relative to the vehicle frame 20 and their positions are determined by the rigid and usually massive swing frame anchors 32 and 33 which are integral with the vehicle frame 20.

FIG. 1 illustrates a loader backhoe 100 in which an exemplary embodiment of the invention is used. The backhoe portion of the loader backhoe 100 includes the linkage 40 having a first end 40a and a second end 40b, the work tool or bucket 50, and a mobile interface system 300. The mobile interface system 300 includes mobile interface structure or swing frame 310, swing frame anchor 320, and four hydraulic cylinders 330a–d. The swing frame anchor 320 includes a ball portion 321 and the swing frame 310 includes a socket portion 313 suitable for receiving the ball portion and forming a ball joint 323. The ball joint 323 is fixed in space and affords three degrees of rotational freedom to the swing frame 310. Each of the hydraulic cylinders 330a–d is pivotally connected to the vehicle frame 200 at a first cylinder end 331a–d, respectively, and to the mobile-interface structure 310 at a second cylinder end 332a–d, respectively, via spherical bushings 333. Thus, in this particular embodiment of the invention, there are three pivotal degrees of freedom at each connection 331a–d and 332a–d for each of the hydraulic cylinders 330a–d. The hydraulic cylinders 330a–d of this embodiment are arranged such that angles α1 is unequal to α2 and α3 is unequal to α4. This assures that each of the hydraulic cylinders 330a–d is uniquely oriented (i.e., the hydraulic cylinders 330a–d are oriented differently from one another as, for example, in FIG. 4), thereby, increasing the overall stability of the mobile interface system 300. The backhoe portion 40 attaches to the swing frame 310 in a manner similar to that of the swing frame 31. A first end 40a is attached to the swing frame 310 at pivot 311 and the second end 40b is attached to the bucket 50 at pivot 42a.

As illustrated in FIGS. 3 through 6, such an arrangement affords sufficient degrees of rotational freedom to allow the control of roll, yaw and pitch movements of the swing frame 310 via the control of positive changes in the lengths of hydraulic cylinders 331a–d. This particular embodiment may be controlled, in a somewhat rudimentary fashion, by an operator manipulating one or more conventional levers or joysticks 21 linked to a controller 340 comprising hard or fixed electrical, electro-magnetic, mechanical or hydraulic connections to displacement control valves 329a–d for each hydraulic cylinder 331a–d, respectively. However, to attain a more sophisticated control over the motion and position of the mobile interface structure 310, the controller 340 must be programmable and programmed to provide a more refined control of the valves as well as a more coordinated effort for the hydraulic cylinders 331a–d in effecting roll, pitch, and yaw movements.

There are existing equations and computer programs for manipulating structures with multiple cylinders having the degrees of rotational freedom described in this embodiment of the invention. However, such programs and equations are primarily used for test operations in test facilities; they must be adapted to each individual work vehicle. Thus, while finished programs may not be available off the shelf, anyone skilled in the art could, without undue difficulty or experimentation, develop a control program for the controller 340 that would provide for sophisticated manipulation of the mobile interface structure 310 via one or more controller devices such as the joystick 21.

Figure 5:
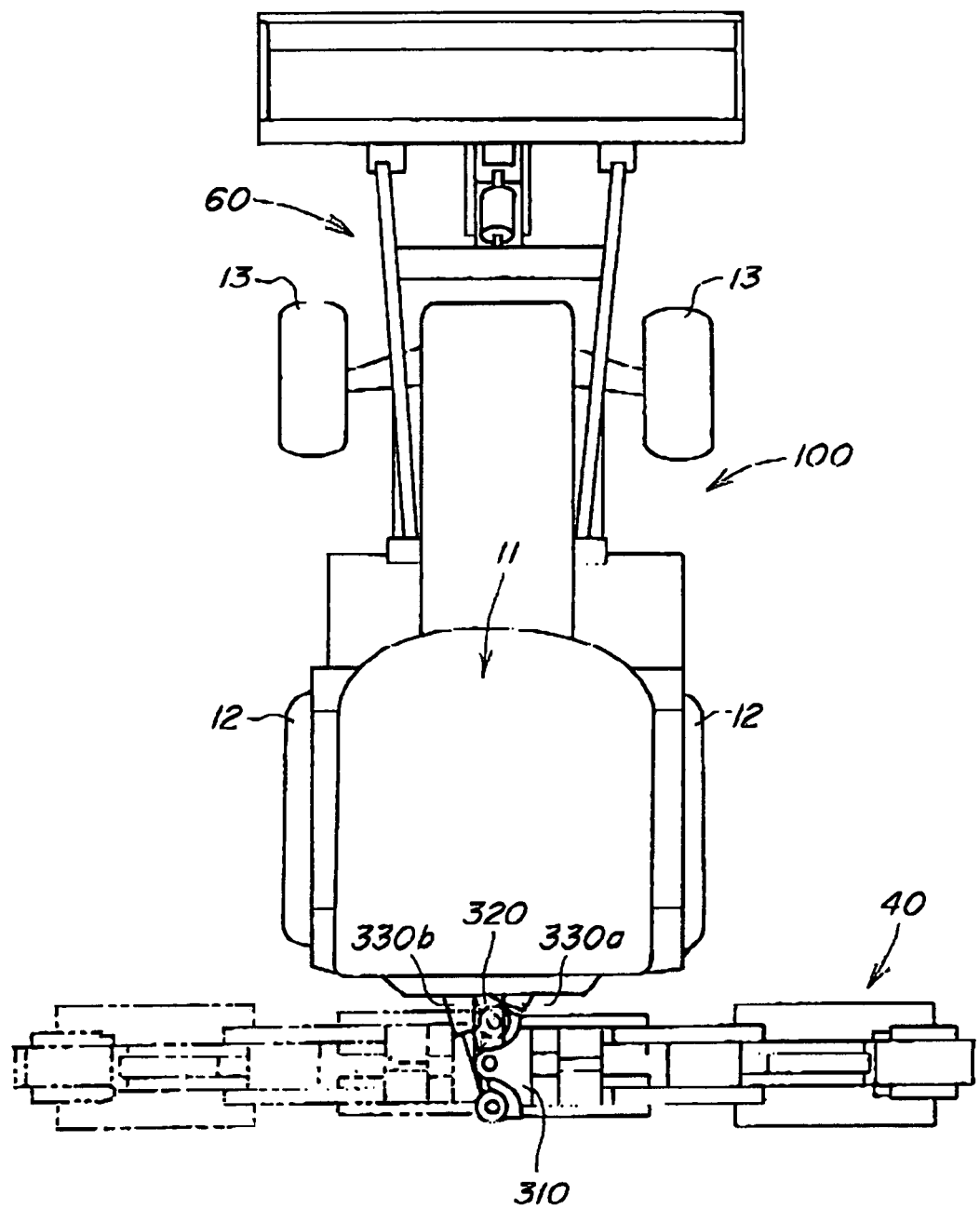
FIG. 5 is an oblique view of the work vehicle illustrating yaw or swinging movement for the invention.
Figure 6:
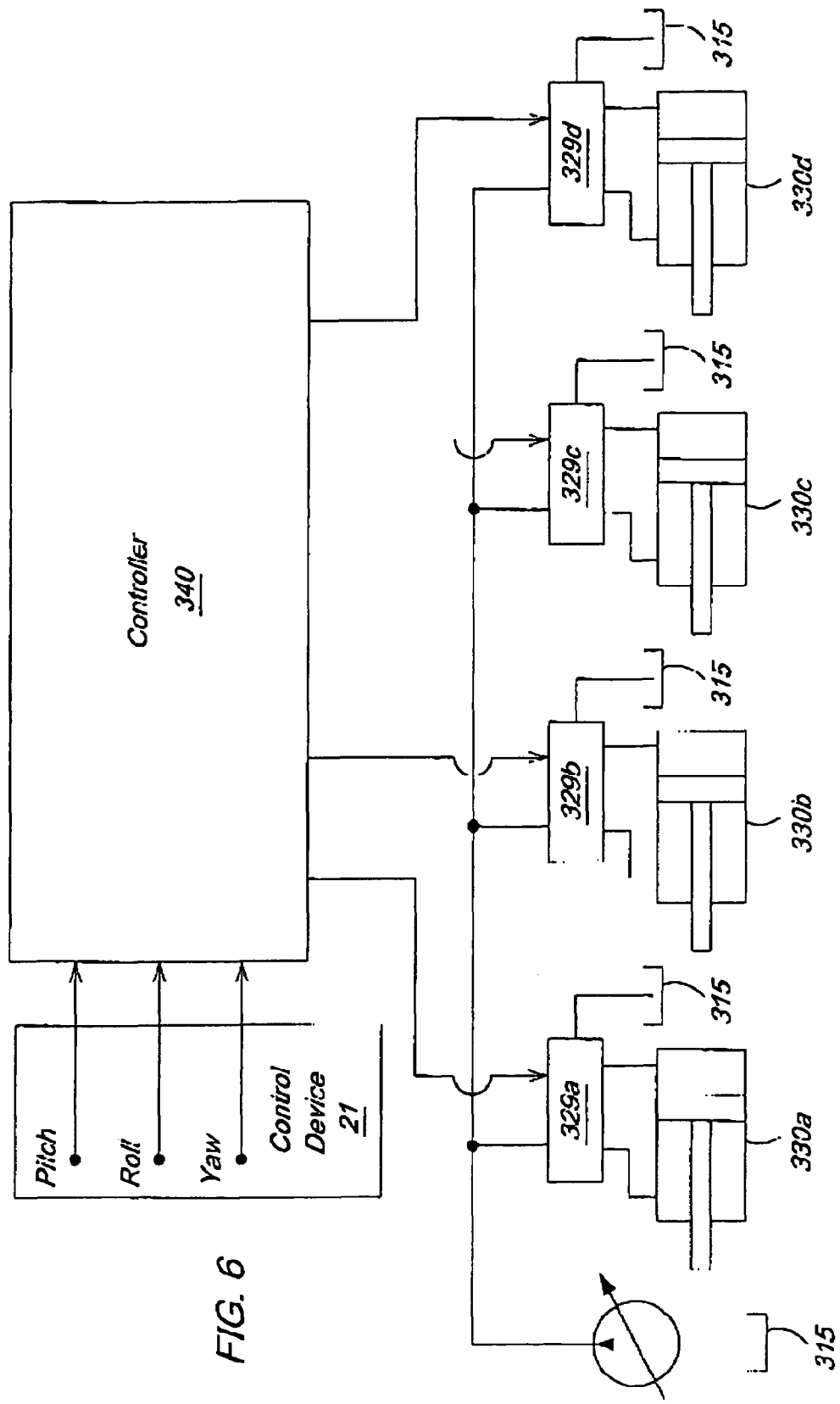
FIG. 6 is a schematic of an exemplary embodiment of the invention.
Figure 7:
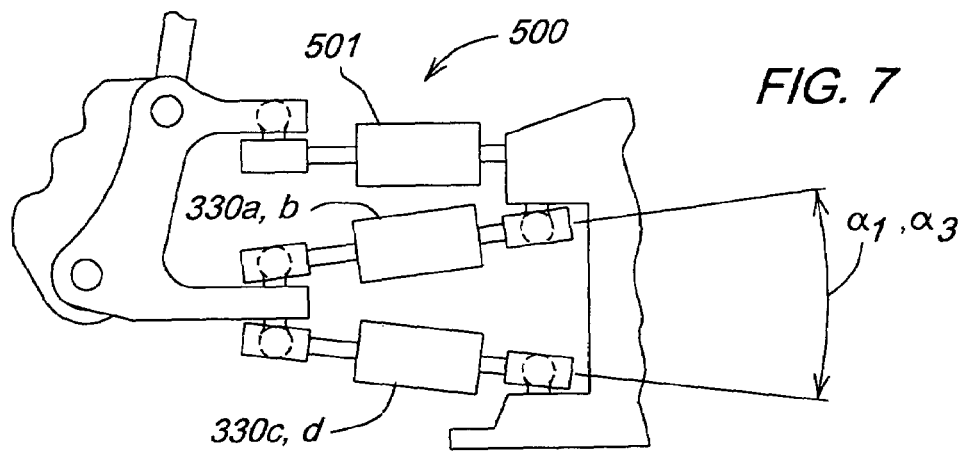
FIG. 7 is an illustration of an embodiment of the mobile interface system having a hydraulic cylinder as an anchor.

FIG. 7 illustrates an embodiment of the mobile interface system 500 in which the anchor is a hydraulic cylinder 501 that is rigidly attached to the vehicle frame 210. This arrangement allows the telescoping or movement of the mobile interface structure 310 away from the vehicle frame 210.

Figure 8:
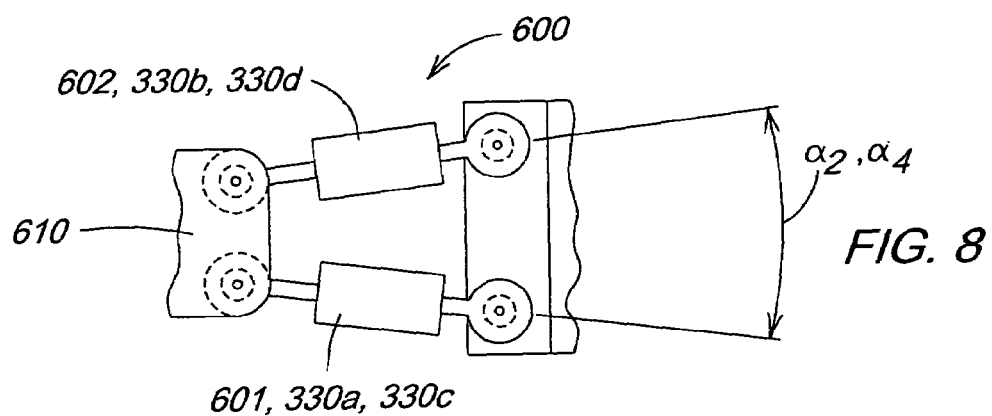
FIG. 8 is an embodiment of the mobile interface system having two hydraulic cylinders as anchors.

FIG. 8 illustrates an embodiment of the mobile interface system 600 having two hydraulic cylinders as anchors 601 and 602 connected to the vehicle frame 400 with pivotal degrees of freedom only in the roll, pitch and yaw directions. This particular embodiment allows pivotal degrees of freedom for the swing frame 610 in the pitch, yaw and roll directions but requires coordinated movements from anchors and 602.

Figure 9:
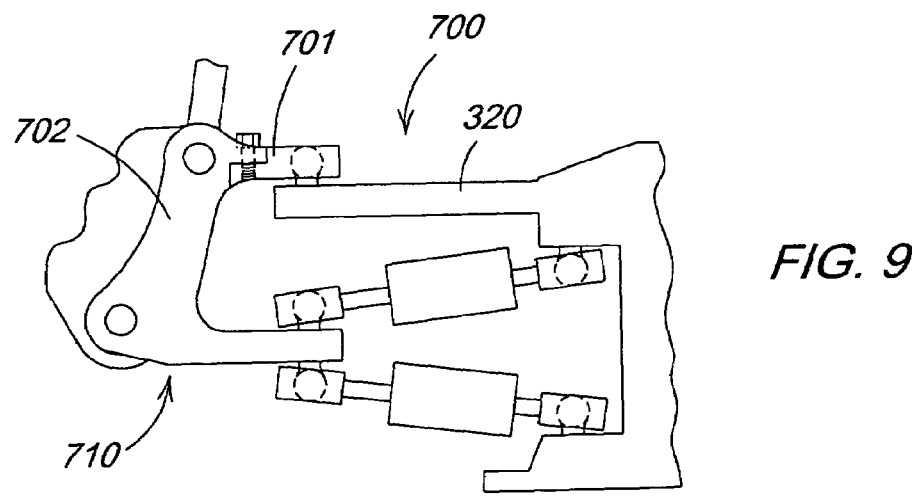
FIG. 9 is an embodiment of the mobile interface system where the socket portion of the mobile interface structure is removable.
Figure 10:
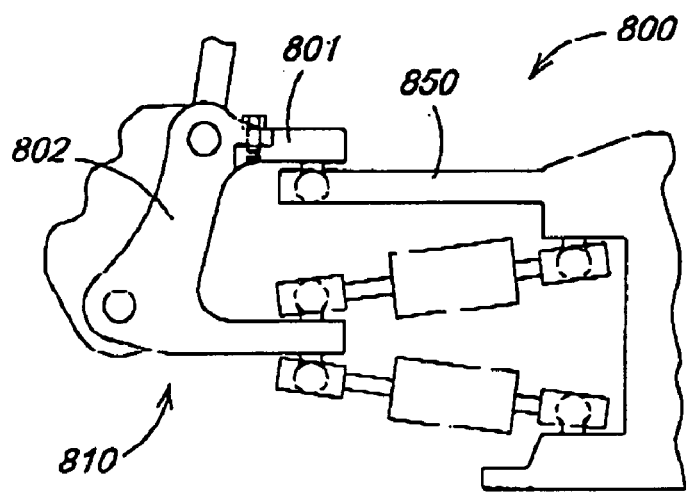
FIG. 10 is an embodiment of the mobile interface system where the anchor has a socket portion, the mating portion of the mobile interface structure has a removable spherical portion.

FIG. 9 illustrates an embodiment of the mobile interface system 700 in which the socket portion 701 of the mobile interface structure 710 is removable. Exemplarily, a fastener (illustrated in FIG. 9) is used to fasten the socket portion 701 to the swing frame member 702. Illustratively, this fastener is threaded allowing its detachment for removal of the socket portion 701. FIG. 10 illustrates an alternate embodiment of the mobile interface system 800 in which the mobile interface structure 810 has a removable spherical portion 801 and the anchor 850 has a socket portion. Exemplarily, a fastener (illustrated in FIG. 10) is used to fasten the socket portion 801 to the swing frame member 802. Illustratively, this fastener is threaded allowing its detachment for removal of the spherical portion 801.

Figure 11:
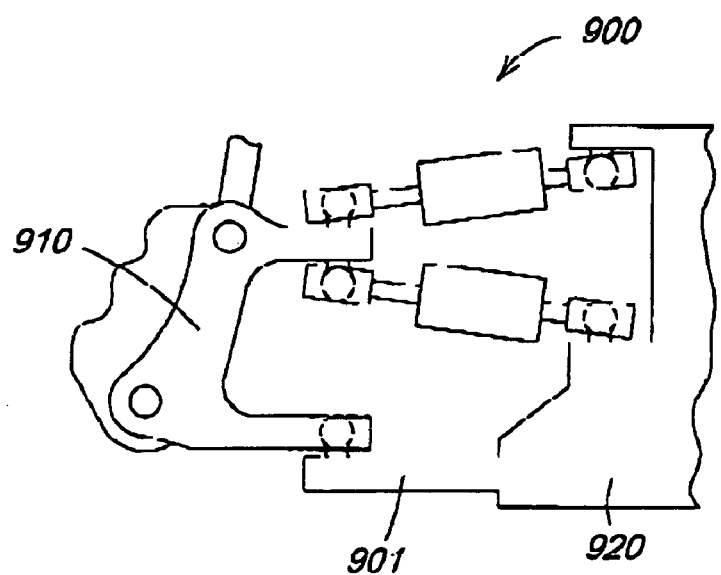
FIG. 11 is another embodiment of the mobile interface system.

FIG. 11 illustrates another embodiment of the mobile interface system 900 in h the anchor 901 is located at a portion of the swing frame 910 that is different all other swing frames illustrated in FIGS. 1 through 10.

Having described the illustrated embodiment, it will become apparent that us modifications can be made without departing from the scope of the invention fined in the accompanying claims.

The invention claimed is:

1. A mobile interface system for a work vehicle, the work vehicle including a vehicle frame; a linkage having a first linkage end and a second linkage end; and a work tool, the mobile interface system comprising:
   at least one mobile interface structure anchor rigidly attachable to the vehicle frame and having a spherical portion;
   a mobile interface structure having at least one socket portion suitable for receiving the spherical portion to form a ball joint;
   at least two radially rigid longitudinally adjustable components having first component ends and second component ends, the at least two longitudinally adjustable components capable of positively altering their length on demand, the first component ends pivotally attachable to the vehicle frame, the second component ends pivotally attached to the mobile interface structure, the first linkage end attached to the mobile interface structure, the second linkage end attachable to the work tool.

2. The mobile interface system of claim 1, wherein the mobile interface structure comprises a swing frame and the at least one mobile interface structure anchor comprises at least one swing frame anchor.

3. The mobile interface system of claim 2, wherein the first ends are pivotally attachable to the vehicle frame with a first at least one pivotal degree of freedom and the second ends are pivotally attached to the swing frame with a second at least one pivotal degree of freedom.

4. The mobile interface system of claim 3, wherein each of the first and second at least one pivotal degrees of freedom includes at least one of pitch movement and yaw movement.

5. The mobile interface system of claim 3, wherein the first at least one pivotal degree of freedom includes pitch movement, yaw movement and roll movement.

6. The mobile interface system of claim 3, wherein the second at least one pivotal degree of freedom includes pitch movement, yaw movement and roll movement.

7. The mobile interface system of claim 2, wherein the at least two longitudinally adjustable components are hydraulic cylinders.

8. The mobile interface system of claim 7, wherein the hydraulic cylinders are attachable to the vehicle frame via spherical bushings.

9. The mobile interface system of claim 7, wherein the hydraulic cylinders are attached to the swing frame via spherical bushings.

10. The mobile interface system of claim 2, wherein the at least one swing frame anchor comprises a solid piece of metal.

11. The mobile interface system of claim 2, wherein the at least one swing frame anchor has a length and is adapted for adjustment of that length.

12. The mobile interface system of claim 11, wherein the at least one swing frame anchor is a hydraulic cylinder.

13. The mobile interface system of claim 2, further comprising a control device and a controller, the controller directing the at least two longitudinally adjustable components to positively alter their lengths in a coordinated manner upon the manipulation of the control device.

14. The mobile interface system of claim 13, wherein the at least two longitudinally adjustable components positively alter their lengths to cause the swing frame to at least one of pitch, roll and yaw on demand.

15. A work vehicle including a vehicle frame; a linkage having a first linkage end and a second linkage end, the linkage including a boom; and a mobile interface system affording multiple degrees of freedom for the boom, the mobile interface system comprising: at least one mobile interface structure anchor rigidly attached to the vehicle frame, the at least one mobile interface structure anchor having a spherical portion;
a mobile interface structure having at least one socket portion suitable for receiving the spherical portion to form a ball joint;
at least two vertically rigid longitudinal components, the at least two longitudinal components capable of positively altering their length on demand, a first end of each of the at least two longitudinal components pivotally attached to the vehicle frame and a second end of each of the at least two longitudinal components pivotally attached to the mobile interface structure, the boom pivotally attached to the mobile interface structure.

16. The work vehicle of claim 15, wherein the mobile interface structure comprises a swing frame and the at least one mobile interface structure anchor comprises at least one swing frame anchor.

17. The work vehicle of claim 16, wherein the first ends are pivotally attached to the vehicle frame with at least one first pivotal degree of freedom and the second ends are pivotally attached to the swing frame with at least one second pivotal degree of freedom in a second plane.

18. The work vehicle of claim 17, wherein the at least one first pivotal degree of freedom includes pitch movement and the at least one second pivotal degree of freedom includes yaw movement.

19. The work vehicle of claim 17, wherein the at least one first pivotal degree of freedom includes yaw movement and the at least one second pivotal degree of freedom includes pitch movement.

20. The work vehicle of claim 17, wherein the at least one first pivotal degree of freedom includes pitch movement, yaw movement and roll movement.

21. The work vehicle of claim 17, wherein the at least one second pivotal degree of freedom includes pitch movement, yaw movement and roll movement.

22. The work vehicle of claim 15, wherein the at least two longitudinal components are hydraulic cylinders.

23. The work vehicle of claim 22, wherein the hydraulic cylinders are attached to the vehicle frame via spherical bushings.

24. The work vehicle of claim 22, wherein the hydraulic cylinders are attached to the swing frame via spherical bushings.

25. The work vehicle of claim 15, wherein the at least one mobile interface structure anchor comprises a solid piece of metal.

26. The work vehicle of claim 15, wherein the at least one mobile interface structure anchor has an adjustable length.

27. The work vehicle of claim 26, wherein the at least one mobile interface structure anchor comprises at least one hydraulic cylinder.

28. The work vehicle of claim 16, further comprising a control device and a controller, the controller directing the at least two longitudinally adjustable components to positively alter their lengths in a coordinated manner upon the manipulation of the control device.

29. The work vehicle of claim 28, wherein the at least two longitudinally adjustable components positively alter their lengths to cause the swing frame to at least one of pitch, roll and yaw on demand.

30. A mobile interface system for a work vehicle, the work vehicle including a vehicle frame; a linkage having a first linkage end and a second linkage end, the linkage including at least a boom and an arm; and a work tool, the mobile interface system comprising:
at least one mobile interface structure anchor rigidly attachable to the vehicle frame and having a spherical portion;
a mobile interface structure having at least one socket portion suitable for receiving the spherical portion to form a ball joint; and
four radially rigid longitudinally adjustable components having first component ends and second component ends, the at least two longitudinally adjustable components capable of positively altering their length on demand, the first component ends pivotally attachable to the vehicle frame, the second component ends pivotally attached to the mobile interface structure, the first linkage end attached to the swing frame, the second linkage end attachable to the work tool.

31. The mobile interface system of claim 30, wherein the first component ends are pivotally attachable to the frame with three pivotal degrees of freedom and the second components ends are pivotally attached to the swing frame with three pivotal degrees of freedom.

32. The mobile interface structure of claim 31, wherein the at least one mobile interface structure anchor comprises at least one hydraulic cylinder having a first anchor end and a second anchor end, the first anchor end being rigidly attachable to the vehicle frame, the second anchor end being pivotally attached to the mobile interface structure with three pivotal degrees of freedom.

33. A work vehicle including a vehicle frame; mobile interface system; a linkage having a first linkage end and a second linkage end, the linkage including at least a boom and an arm; and a work tool, the mobile interface system comprising:
   at least one mobile interface structure anchor rigidly attached to the vehicle frame and having a spherical portion;
   a mobile interface structure having at least one socket portion suitable for receiving the spherical portion to form a ball joint; and
   four radially rigid longitudinally adjustable components having first component ends and second component ends, the at least two longitudinally adjustable components capable of positively altering their length on demand, the first component ends pivotally attached to the vehicle frame, the second component ends pivotally attached to the mobile interface structure, the first linkage end attached to the swing frame, the second linkage end attached to the work tool.

34. The work vehicle of claim 33, wherein the first component ends are pivotally attached to the frame with three pivotal degrees of freedom and the second component ends are pivotally attached to the swing frame with three pivotal degrees of freedom.

35. The work vehicle of claim 34, wherein the at least one mobile interface structure anchor comprises at least one hydraulic cylinder having a first anchor end and a second anchor end, the first anchor end being rigidly attached to the vehicle frame, the second anchor end being pivotally attached to the mobile interface structure with three pivotal degrees of freedom.

* * * * *